United States Patent
Tang et al.

(10) Patent No.: US 12,272,992 B2
(45) Date of Patent: Apr. 8, 2025

(54) STATOR STRUCTURE AND METHOD FOR MANUFACTURING STATOR STRUCTURE

(71) Applicant: XPT (NANJING) E-POWERTRAIN TECHNOLOGY CO., LTD., Jiangsu (CN)

(72) Inventors: Zhengyu Tang, Jiangsu (CN); Di Wang, Jiangsu (CN); Zhixin Yu, Jiangsu (CN); Wei Wang, Jiangsu (CN); Jiebao Li, Jiangsu (CN); Li Han, Jiangsu (CN)

(73) Assignee: XPT (NANJING) E-POWERTRAIN TECHNOLOGY CO., LTD., Jiangsu (CN)

( * ) Notice: Subject to any disclaimer, the term of this patent is extended or adjusted under 35 U.S.C. 154(b) by 303 days.

(21) Appl. No.: 17/885,023

(22) Filed: Aug. 10, 2022

(65) Prior Publication Data
US 2023/0047962 A1 Feb. 16, 2023

(30) Foreign Application Priority Data
Aug. 11, 2021 (CN) .......................... 202110917791.4

(51) Int. Cl.
*H02K 1/20* (2006.01)
*H02K 1/16* (2006.01)
(Continued)

(52) U.S. Cl.
CPC ................ *H02K 1/20* (2013.01); *H02K 1/16* (2013.01); *H02K 9/19* (2013.01); *H02K 15/024* (2013.01)

(58) Field of Classification Search
CPC ............ H02K 1/16; H02K 9/19; H02K 9/193; H02K 9/197; H02K 1/20; H02K 1/32; H02K 15/024
(Continued)

(56) References Cited

U.S. PATENT DOCUMENTS

| 8,482,167 B2 | 7/2013 | Erfanfar et al. |
| 2012/0080983 A1* | 4/2012 | Lund ........................ H02K 1/20 310/60 A |

(Continued)

FOREIGN PATENT DOCUMENTS

| CN | 112104171 A | * 12/2020 | ............... H02K 1/20 |
| DE | 102007048683 | 4/2008 | |

OTHER PUBLICATIONS

Machine Translation of CN_112104171_A (Year: 2020).*
(Continued)

*Primary Examiner* — Thomas Truong
*Assistant Examiner* — Charlie Frank Mann, Jr.
(74) *Attorney, Agent, or Firm* — Sheridan Ross P.C.

(57) ABSTRACT

A stator structure is provided and includes a plurality of first lamination layers, a plurality of second lamination layers, two third lamination layers and two oil spraying rings. The second lamination layers are sandwiched in between the first lamination layers. The second lamination layer located in the middle of the stator structure is sandwiched in between the two third lamination layers. The two oil spraying rings are connected to two first lamination layers located at outermost sides. Another stator structure is provided and includes a plurality of first lamination layers, a second lamination layer and two oil spraying rings. The second lamination layer is sandwiched in between two first lamination layers. The two oil spraying rings are connected to two first lamination layers located at outermost sides. By means of the arrangement of the aforesaid stator structure, the invention can effectively improve heat dissipating effect for oil cooling.

7 Claims, 19 Drawing Sheets

(51) Int. Cl.
*H02K 9/19* (2006.01)
*H02K 15/02* (2006.01)

(58) Field of Classification Search
USPC .................. 310/54, 58, 59, 216.071, 216.01
See application file for complete search history.

(56) References Cited

U.S. PATENT DOCUMENTS

2015/0280525 A1* 10/2015 Rippel ..................... H02K 9/24
310/54
2019/0348889 A1* 11/2019 Liu ........................ H02K 9/197

OTHER PUBLICATIONS

Partial Search Report for European Patent Application No. 22189701.0, dated Jan. 9, 2023, 22 pages.

Extended Search Report for European Patent Application No. 22189701.0, dated Apr. 12, 2023, 18 pages.

* cited by examiner

STATOR STRUCTURE AND METHOD FOR MANUFACTURING STATOR STRUCTURE

CROSS-REFERENCE TO RELATED APPLICATION

This application claims the benefit of China Application No. 202110917791.4 filed Aug. 11, 2021, the entire contents of which are incorporated herein by reference in its entirety.

TECHNICAL FIELD

The invention relates to a stator structure and a method for manufacturing the stator structure and, more particularly, to a stator structure capable of effectively improving heat dissipating effect for oil cooling and a method for manufacturing the stator structure.

BACKGROUND ART

As new energy vehicles and other applications require higher and higher power density of motor, it is very difficult to prevent the temperature of the motor from rising under high power density and high torque density. Furthermore, since there is a trend to develop integrated driving mechanism, higher heat dissipating capacity is required for the system. Water cooling technology is the main heat dissipating method so far, but it cannot directly cool the heat source. Heat at a winding needs to pass through an insulating layer in a slot and a stator of the motor to be transferred to an outer casing and be taken away by the water. The transmission path is long, the heat dissipating efficiency is low, and the tolerance between components affects the thermal resistance of the transmission path.

At present, oil cooling technology with higher heat dissipating efficiency has become a significant research issue. According to the contact manner between the cooling oil and the stator yoke portion, the oil cooling technology is mainly divided into direct oil cooling and indirect oil cooling. The direct oil cooling further includes oil immersion type and oil spraying type. The oil immersion type is to immerse the stator and rotor of the motor in cooling oil for cooling, but the efficiency of the motor will be affected. The oil spraying type is to add oil passages in the stator yoke portion and the cooling oil is sprayed to the end or other portions of the stator through the oil passages for cooling. However, since the contact area between the oil passage and the cooling oil is too small, the heat dissipating effect is not good enough.

SUMMARY OF THE INVENTION

The invention provides a stator structure capable of effectively improving heat dissipating effect for oil cooling and a method for manufacturing the stator structure.

According to an embodiment of the invention, a stator structure includes a plurality of first lamination layers, a plurality of second lamination layers, two third lamination layers and two oil spraying rings. Each first lamination layer is formed by stacking at least one first lamination. Each first lamination has a first notch. The first notches of two adjacent first lamination layers are misaligned by 180 degrees. The second lamination layers are sandwiched in between the first lamination layers. Each second lamination layer is formed by stacking a plurality of second laminations. Each second lamination has a plurality of first oil passages. The first oil passages of two adjacent second lamination layers are misaligned. The second lamination layer located in the middle of the stator structure is sandwiched in between the two third lamination layers. Each third lamination layer is formed by stacking a plurality of third laminations. Each third lamination has a second notch and a plurality of second oil passages. The second notch is misaligned with the first notch of the first lamination layer adjacent to the third lamination layer by 180 degrees. The second oil passages are misaligned with the first oil passages. The two oil spraying rings are connected to two first lamination layers located at outermost sides.

According to another embodiment of the invention, a method for manufacturing a stator structure includes steps of (a) stacking at least one first lamination to form a first lamination layer; (b) stacking a plurality of second laminations on the first lamination layer to form a plurality of second lamination layers, wherein when stacking the second lamination layers, stacking one second lamination layer first and then rotating and stacking next second lamination layer by an angle, such that a plurality of first oil passages of two adjacent second lamination layers are misaligned; (c) rotating and stacking at least one first lamination on the second lamination layer by 180 degrees to form another first lamination layer, wherein two first notches of two adjacent first lamination layers are misaligned by 180 degrees; (d) performing the step (b) again; (e) stacking a plurality of third laminations on the second lamination layer to form a third lamination layer, wherein a second notch of the third lamination layer is misaligned with the first notch of the first lamination layer adjacent to the third lamination layer by 180 degrees, and a plurality of second oil passages of the third lamination layer are misaligned with the first oil passages of the second lamination layer adjacent to the third lamination layer; (f) repeating the steps (b) and (C); and (g) connecting two oil spraying rings to two first lamination layers located at outermost sides.

According to another embodiment of the invention, a stator structure includes a plurality of first lamination layers, a second lamination layer and two oil spraying rings. Each first lamination layer is formed by stacking at least one first lamination. Each first lamination has a plurality of first oil passages. The first oil passages of two adjacent first lamination layers are misaligned. The second lamination layer is sandwiched in between two first lamination layers. The second lamination layer is formed by stacking a plurality of second laminations. Each second lamination has a notch and a plurality of second oil passages. The second oil passages are misaligned with the first oil passages. The two oil spraying rings are connected to two first lamination layers located at outermost sides. Each oil spraying ring has a plurality of oil passage switching recesses, an oil passage outlet, a plurality of oil spraying holes and a circular recess. The oil passage switching recesses and the oil passage outlet are arranged in a circular shape. The oil spraying holes are formed in the circular recess. The oil passage outlet communicates with the circular recess. Each oil passage switching recess and the oil passage outlet respectively communicate with parts of the first oil passages. The oil passage switching recesses of the two oil spraying rings are misaligned.

According to another embodiment of the invention, a method for manufacturing a stator structure includes steps of (a) stacking a plurality of first laminations to form a plurality of first lamination layers, wherein when stacking the first lamination layers, stacking one first lamination layer first and then rotating and stacking next first lamination layer by an angle, such that a plurality of first oil passages of two adjacent first lamination layers are misaligned; (b) stacking a plurality of second laminations on the first lamination layer to form a second lamination layer, wherein a plurality of second oil passages of the second lamination layer are misaligned with the first oil passages of the first lamination layer adjacent to the second lamination layer; (c) repeating the step (a); and (d) connecting two oil spraying rings to two first lamination layers located at outermost sides, wherein each oil spraying ring has a plurality of oil passage switching recesses, an oil passage outlet, a plurality of oil spraying holes and a circular recess, the oil passage switching recesses and the oil passage outlet are arranged in a circular shape, the oil spraying holes are formed in the circular recess, the oil passage outlet communicates with the circular recess, each oil passage switching recess and the oil passage outlet respectively communicate with parts of the first oil passages, and the oil passage switching recesses of the two oil spraying rings are misaligned.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
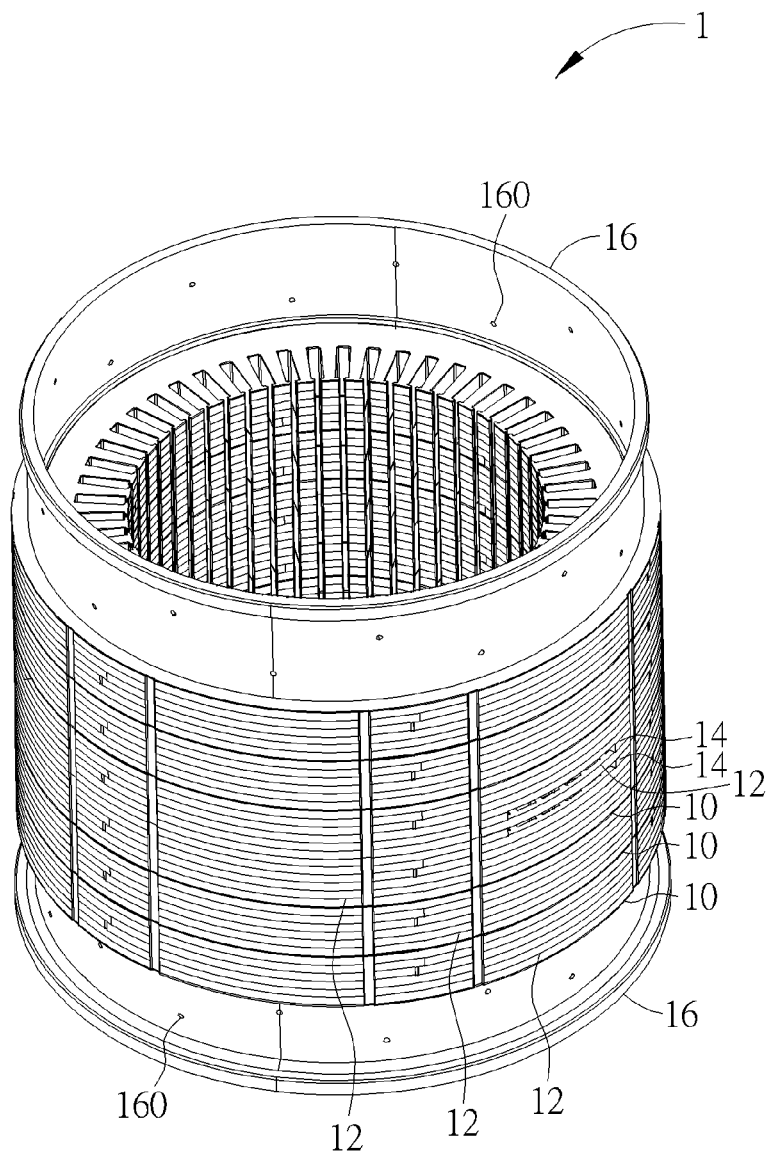
FIG. 1 is a perspective view illustrating a stator structure according to an embodiment of the invention.
Figure 2:
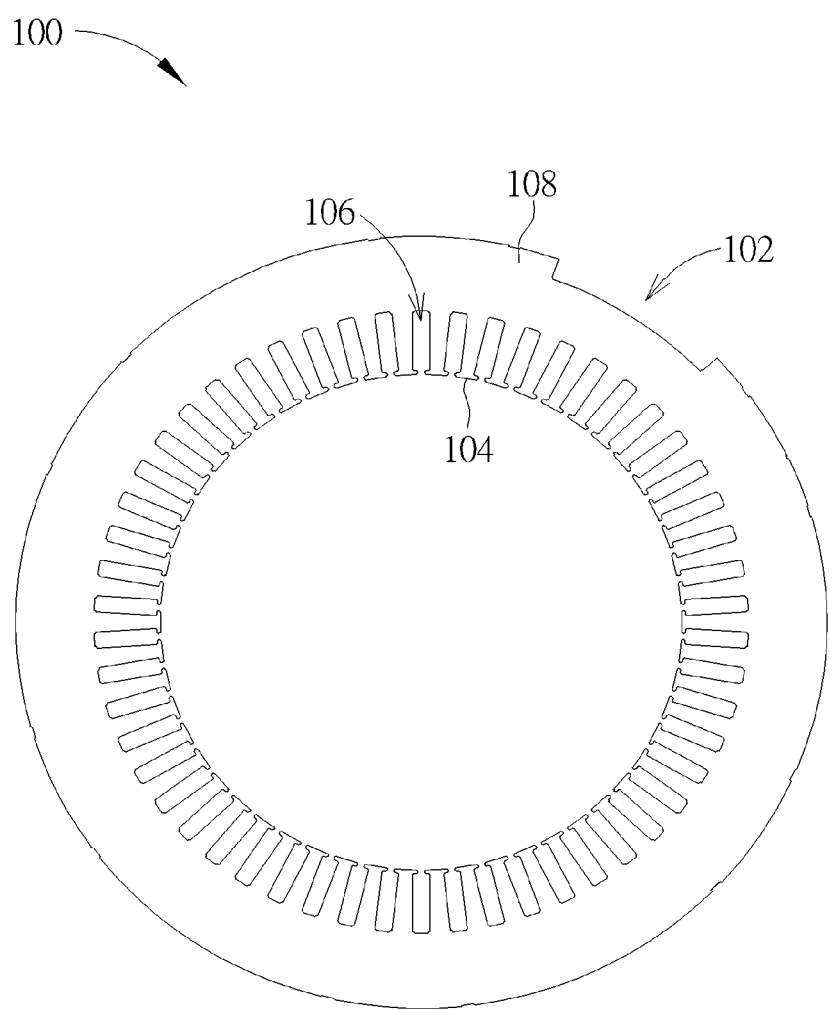
FIG. 2 is a top view illustrating a first lamination according to an embodiment of the invention.
Figure 3:
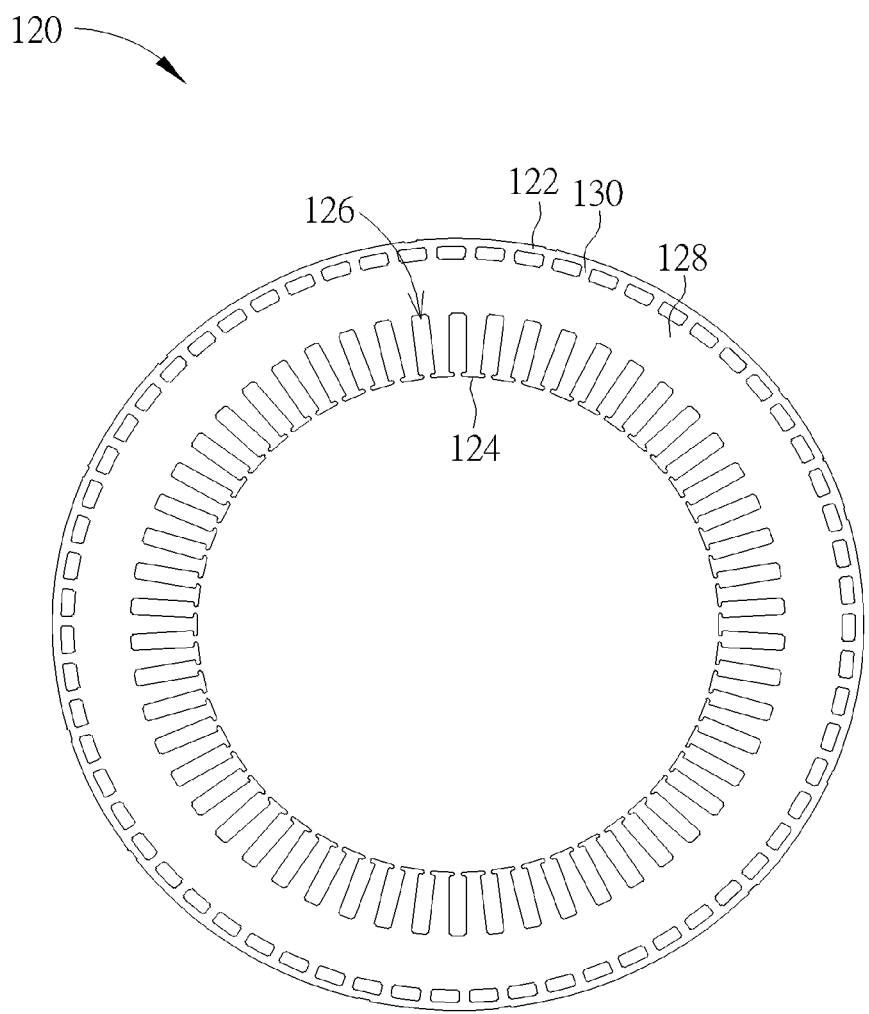
FIG. 3 is a top view illustrating a second lamination according to an embodiment of the invention.
Figure 4:
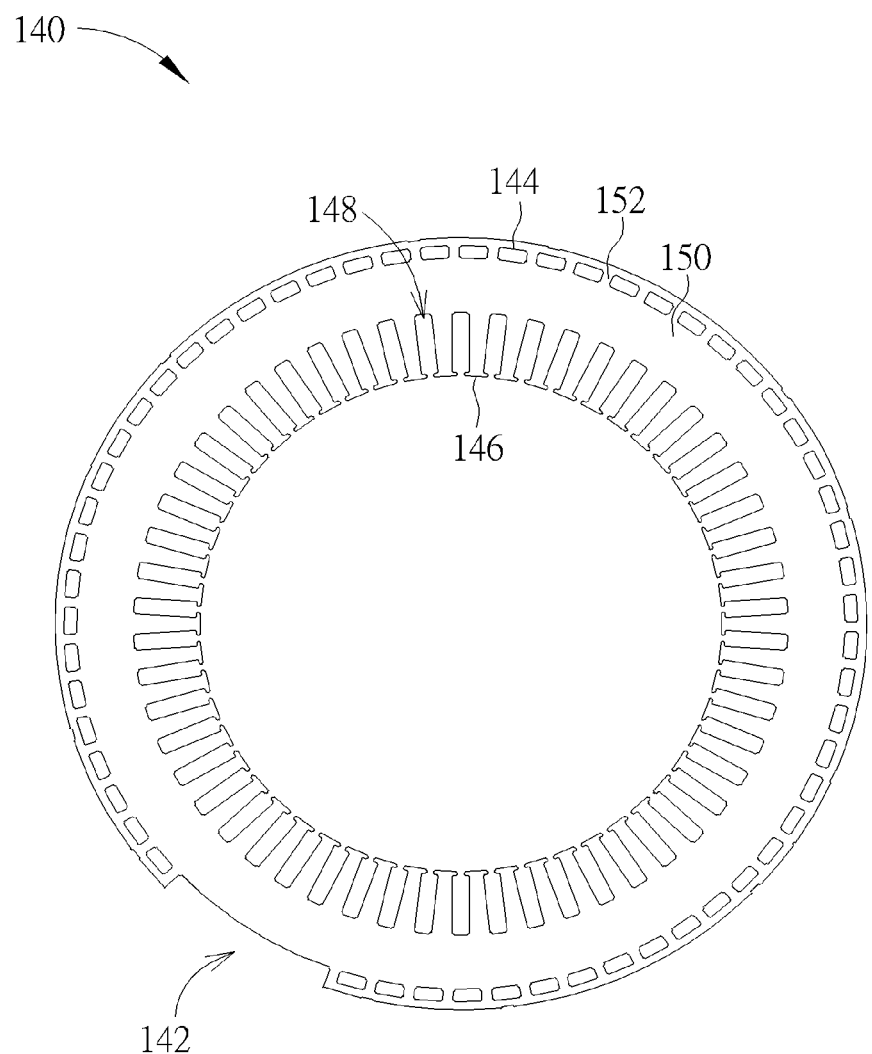
FIG. 4 is a top view illustrating a third lamination according to an embodiment of the invention.
Figure 5:
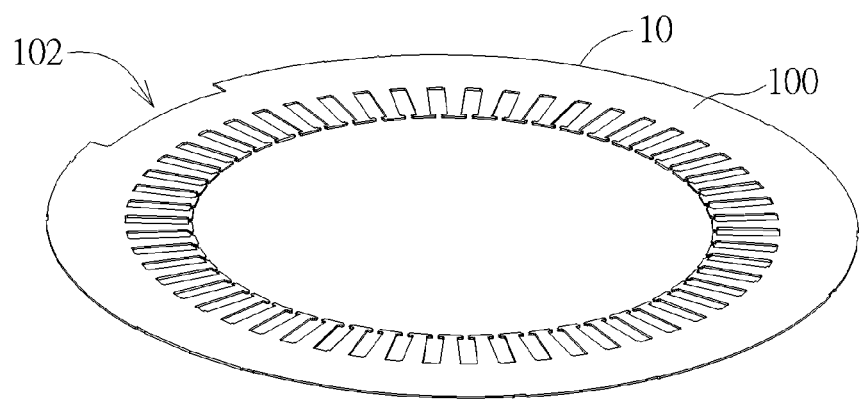
FIGS. 5 to 10 are perspective views illustrating processes of manufacturing the stator structure shown in FIG. 1.
Figure 6:
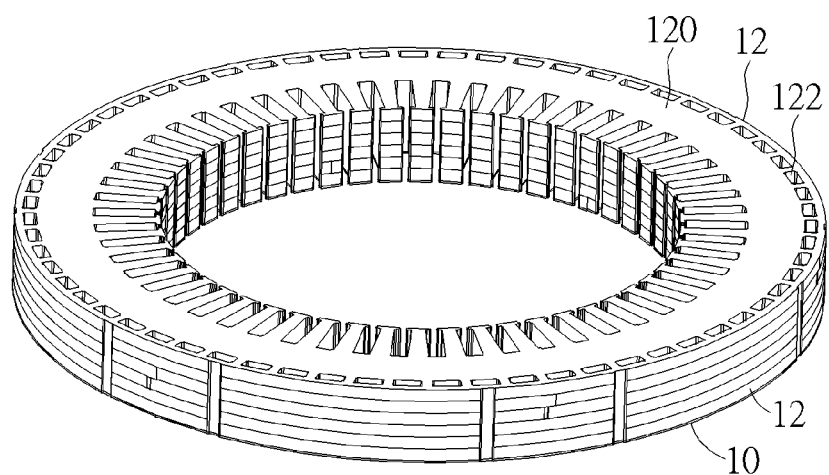
Figure 11:
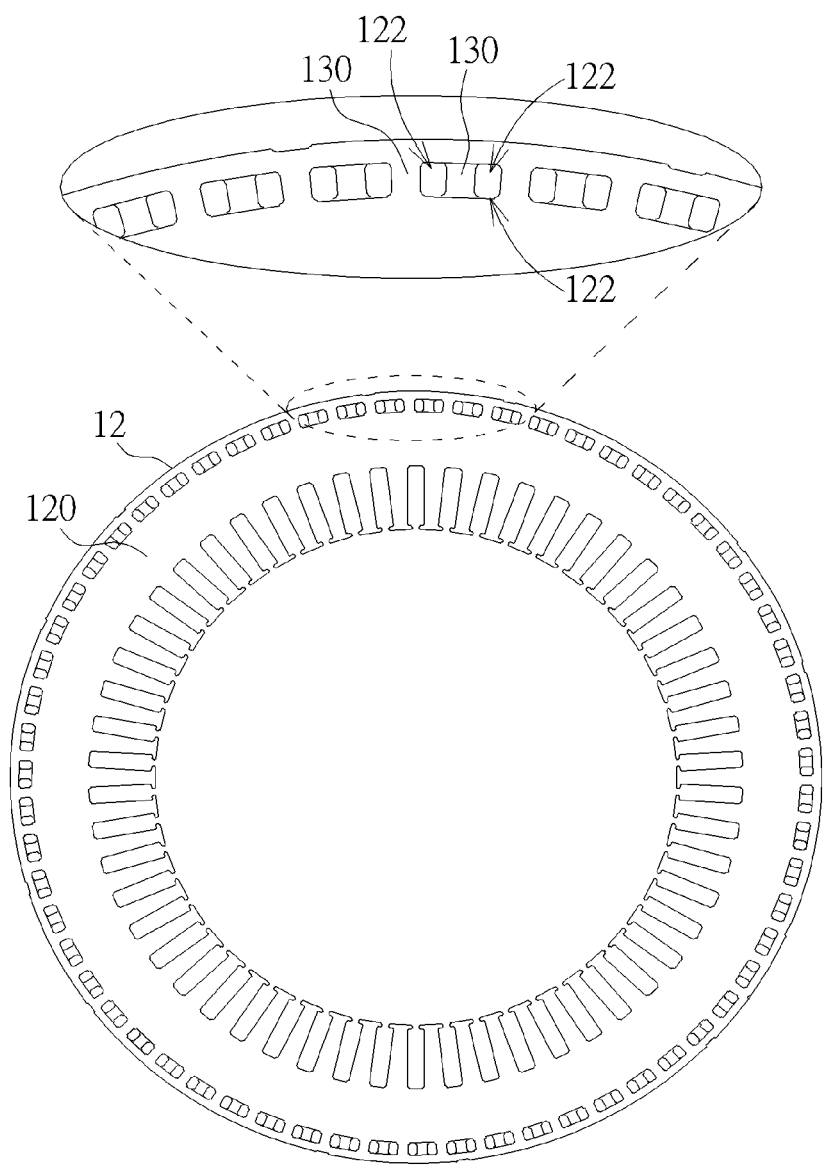
FIG. 11 is a top view illustrating two adjacent second lamination layers shown in FIG. 6.

Referring to FIGS. 1 to 11, FIG. 1 is a perspective view illustrating a stator structure 1 according to an embodiment of the invention, FIG. 2 is a top view illustrating a first lamination 100 according to an embodiment of the invention, FIG. 3 is a top view illustrating a second lamination 120 according to an embodiment of the invention, FIG. 4 is a top view illustrating a third lamination 140 according to an embodiment of the invention, FIGS. 5 to 10 are perspective views illustrating processes of manufacturing the stator structure 1 shown in FIG. 1, and FIG. 11 is a top view illustrating two adjacent second lamination layers 12 shown in FIG. 6.

As shown in FIG. 1, a stator structure 1 includes a plurality of first lamination layers 10, a plurality of second lamination layers 12, two third lamination layers 14 and two oil spraying rings 16. The second lamination layers 12 are sandwiched in between the first lamination layers 10. The second lamination layer 12 located in the middle of the stator structure 1 is sandwiched in between the two third lamination layers 14. The two oil spraying rings 16 are connected to two first lamination layers 10 located at outermost sides.

Each first lamination layer 10 is formed by stacking at least one first lamination 100 (as shown in FIG. 2), wherein the first lamination 100 may be a silicon steel sheet. In this embodiment, each first lamination layer 10 consists of one first lamination 100, but the invention is not so limited. The number of the first lamination layers 10 and the number of the first laminations 100 of each first lamination layer 10 may be determined according to structural requirements. As shown in FIG. 2, the first lamination 100 has a first notch 102, a plurality of first stator tooth portions 104, a plurality of first stator slots 106 and a first stator yoke portion 108. The first stator yoke portion 108 is circular. The first notch 102 is formed on the first stator yoke portion 108. The first stator tooth portions 104 and the first stator slots 106 are staggered with respect to each other in a circular shape.

Each second lamination layer 12 is formed by stacking a plurality of second laminations 120 (as shown in FIG. 3), wherein the second lamination 120 may be a silicon steel sheet. The number of the second lamination layers 12 and the number of the second laminations 120 of each second lamination layer 12 may be determined according to structural requirements. As shown in FIG. 3, the second lamination 120 has a plurality of first oil passages 122, a plurality of second stator tooth portions 124, a plurality of second stator slots 126 and a second stator yoke portion 128. The second stator yoke portion 128 is circular. The first oil passages 122 are formed on the second stator yoke portion 128, wherein a first support rib 130 is between two adjacent first oil passages 122. The second stator tooth portions 124 and the second stator slots 126 are staggered with respect to each other in a circular shape.

Each third lamination layer 14 is formed by stacking a plurality of third laminations 140 (as shown in FIG. 4), wherein the third lamination 140 may be a silicon steel sheet. The number of the third laminations 140 of each third lamination layer 14 may be determined according to structural requirements. As shown in FIG. 4, the third lamination 140 has a second notch 142, a plurality of second oil passages 144, a plurality of third stator tooth portions 146, a plurality of third stator slots 148 and a third stator yoke portion 150. The third stator yoke portion 150 is circular. The second notch 142 and the second oil passages 144 are formed on the third stator yoke portion 150, wherein a second support rib 152 is between two adjacent second oil passages 144. The third stator tooth portions 146 and the third stator slots 148 are staggered with respect to each other in a circular shape.

Figure 7:
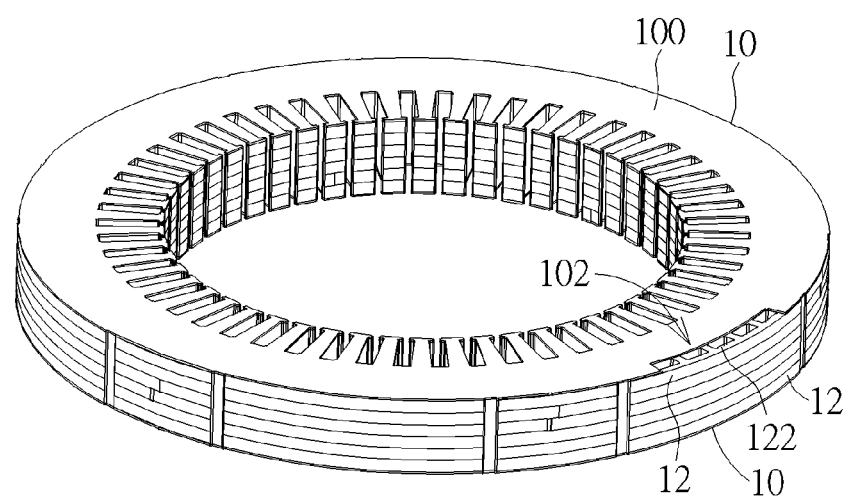

As shown in FIG. 5, the invention may stack at least one first lamination 100 to form a first lamination layer 10 first. Then, as shown in FIG. 6, the invention may stack a plurality of second laminations 120 on the first lamination layer 10 shown in FIG. 5 to form a plurality of second lamination layers 12. When stacking the second lamination layers 12, the invention stacks one second lamination layer 12 first and then rotates and stacks next second lamination layer 12 by an angle, such that the first oil passages 122 of two adjacent second lamination layers 12 are misaligned, as shown in FIG. 11. Then, as shown in FIG. 7, the invention may rotate and stack at least one first lamination 100 on the second lamination layer 12 shown in FIG. 6 by 180 degrees to form another first lamination layer 10. Thus, as shown in FIGS. 5 and 7, two first notches 102 of two adjacent first lamination layers 10 are misaligned by 180 degrees.

Figure 8:
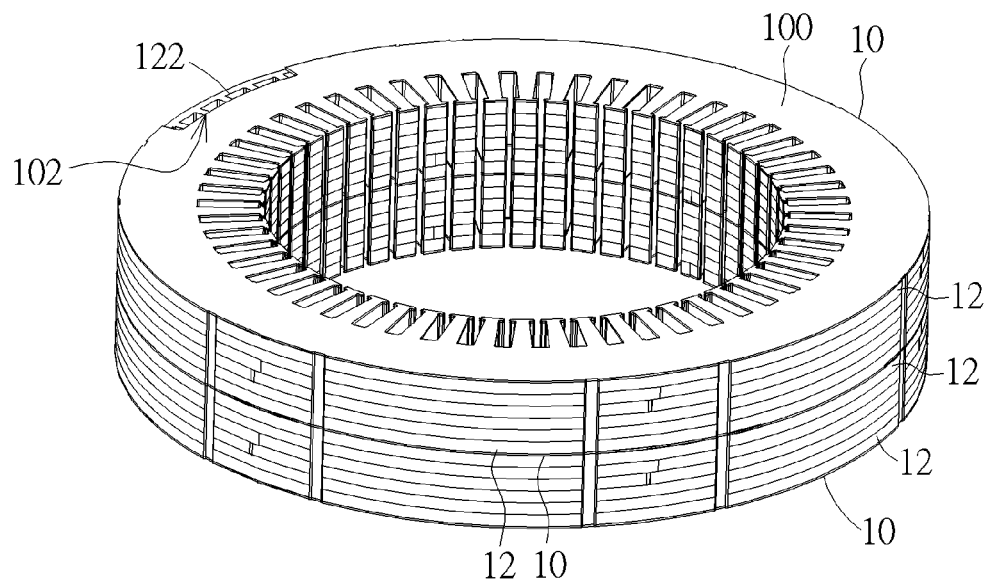
Figure 9:
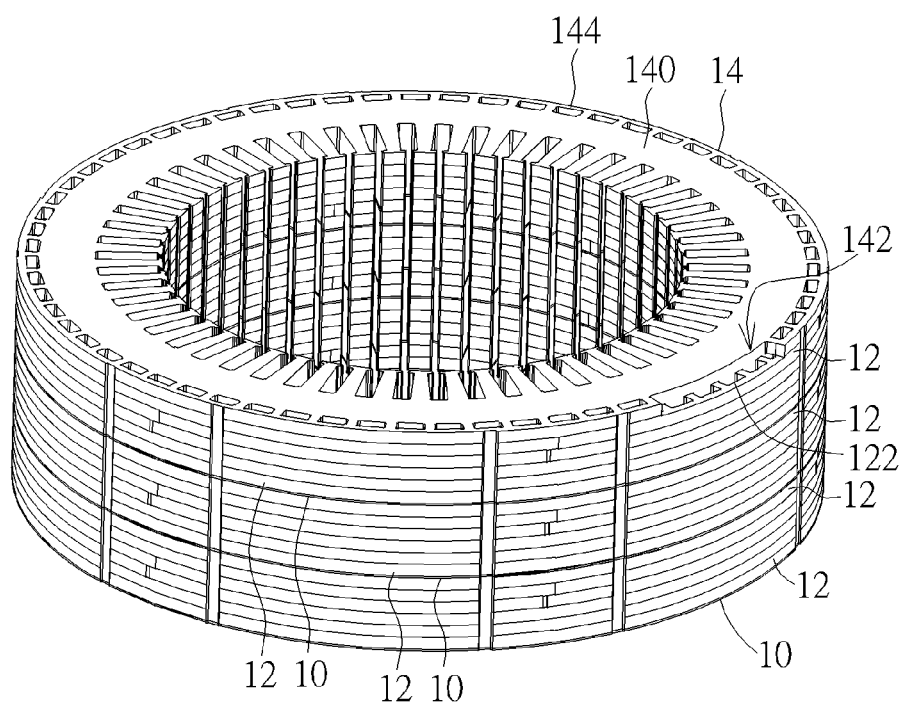
Figure 10:
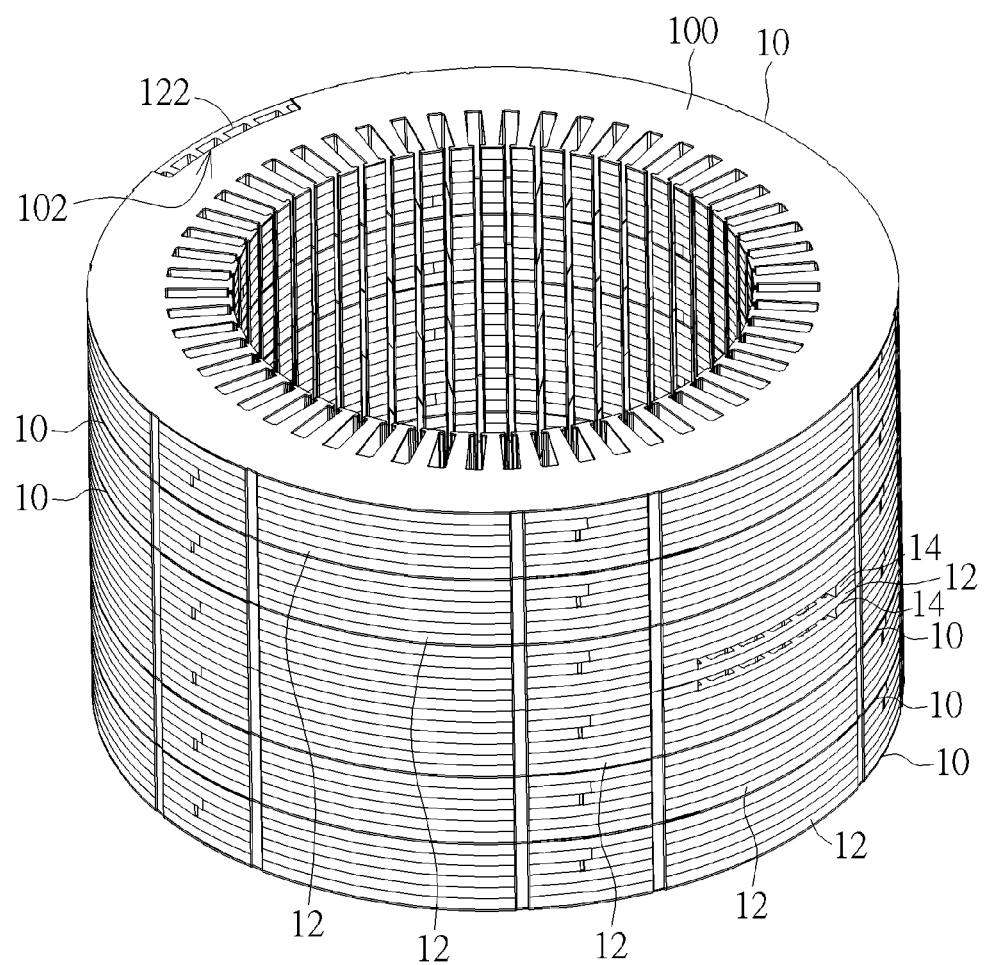

Then, as shown in FIG. 8, the invention further stacks a plurality of second laminations 120 on the first lamination layer 10 shown in FIG. 7 to form a plurality of second lamination layers 12. The invention further rotates and stacks at least one first lamination 100 on the second lamination layer 12 by 180 degrees to form another first lamination layer 10. Then, as shown in FIG. 9, the invention further stacks a plurality of second laminations 120 on the first lamination layer 10 shown in FIG. 8 to form a plurality of second lamination layers 12. Then, the invention further stacks a plurality of third laminations 140 on the second lamination layer 12 to form a third lamination layer 14. As shown in FIGS. 8 and 9, the second notch 142 of the third lamination layer 14 is misaligned with the first notch 102 of the first lamination layer 10 adjacent to the third lamination layer 14 by 180 degrees. Furthermore, the second oil passages 144 of the third lamination layer 14 are also misaligned with the first oil passages 122 of the second lamination layer 12 adjacent to the third lamination layer 14 (as the misaligned arrangement shown in FIG. 11). Then, the invention further stacks the first lamination 100, the second lamination 120 and the third lamination 140 according to the aforesaid manner to obtain the symmetrical structure shown in FIG. 10. Then, as shown in FIG. 1, the invention further connects two oil spraying rings 16 to two first lamination layers 10 located at outermost sides of FIG. 10, so as to complete the manufacture of the stator structure 1.

In the stator structure 1, the first stator tooth portions 104 of the first lamination layer 10, the second stator tooth portions 124 of the second lamination layer 12 and the third stator tooth portions 146 of the third lamination layer 14 are aligned with each other, and the first stator slots 106 of the first lamination layer 10, the second stator slots 126 of the second lamination layer 12 and the third stator slots 148 of the third lamination layer 14 are aligned with each other, so as to avoid hindering the subsequent winding of a winding.

When the heat generated by a motor equipped with the stator structure 1 is dissipated by oil cooling, cooling oil can be injected from the second notch 142 of the third lamination layer 14. At this time, the cooling oil flows along the first oil passages 122 of the second lamination layer 12, the second oil passages 144 of the third lamination layer 14 and the first notch 102 of the first lamination layer 10, and then flows into the oil spraying ring 16 from the first notch 102 of the first lamination layer 10 located at outermost side. Then, the cooling oil is sprayed to internal components of the stator structure 1 from a plurality of oil spraying holes 160 of the oil spraying ring 16 for performing oil cooling.

By means of the stacking and arrangement of the first lamination layer 10, the second lamination layer 12 and the third lamination layer 14, the invention not only can effectively increase the contact area between the oil passage and the cooling oil, but also can reduce the cross-sectional area of the flow path of the cooling oil, thereby increasing the flow rate of the cooling oil. Accordingly, the stator structure 1 of the invention can effectively improve heat dissipating effect for oil cooling.

Figure 12:
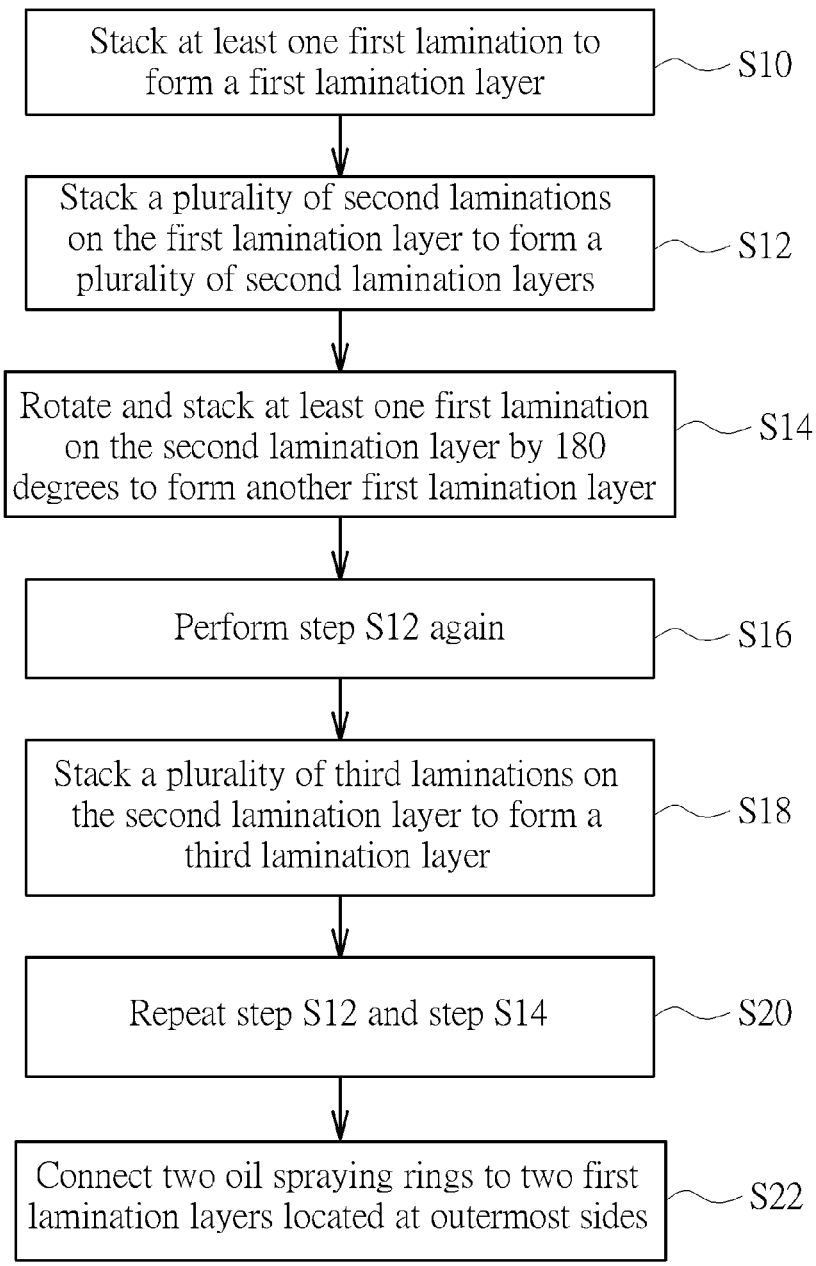
FIG. 12 is a flowchart illustrating a method for manufacturing a stator structure according to an embodiment of the invention.

Referring to FIG. 12, FIG. 12 is a flowchart illustrating a method for manufacturing a stator structure according to an embodiment of the invention. First, step S10 is performed to stack at least one first lamination 100 to form a first lamination layer 10. Then, step S12 is performed to stack a plurality of second laminations 120 on the first lamination layer 10 to form a plurality of second lamination layers 12, wherein when stacking the second lamination layers 12, the invention stacks one second lamination layer 12 first and then rotates and stacks next second lamination layer 12 by an angle, such that a plurality of first oil passages 122 of two adjacent second lamination layers 12 are misaligned. Then, step S14 is performed to rotate and stack at least one first lamination 100 on the second lamination layer 12 by 180 degrees to form another first lamination layer 10, wherein two first notches 102 of two adjacent first lamination layers 10 are misaligned by 180 degrees. The, step S16 is performed to perform step S12 again. Then, step S18 is performed to stack a plurality of third laminations 140 on the second lamination layer 12 to form a third lamination layer 14, wherein a second notch 142 of the third lamination layer 14 is misaligned with the first notch 102 of the first lamination layer 10 adjacent to the third lamination layer 14 by 180 degrees, and a plurality of second oil passages 144 of the third lamination layer 14 are misaligned with the first oil passages 122 of the second lamination layer 12 adjacent to the third lamination layer 14. Then, step S20 is performed to repeat step S12 and step S14. Then, step S22 is performed to connect two oil spraying rings 16 to two first lamination layers 10 located at outermost sides. Preferably, the method for manufacturing the stator structure of the invention may further include the following step. After step S14 is performed, the invention may repeat step S12 and step S14 at least one time first and then perform step S16. For further illustration, after step S14 is performed, the invention may repeat or not repeat step S12 and step S14 according to structural requirements of the stator structure 1. When step S12 and step S14 are repeated, the repeating times may also be determined according to structural requirements of the stator structure 1. It should be noted that the detailed embodiments of the stator structure 1 are mentioned in the above and those will not be depicted herein again.

Figure 13:
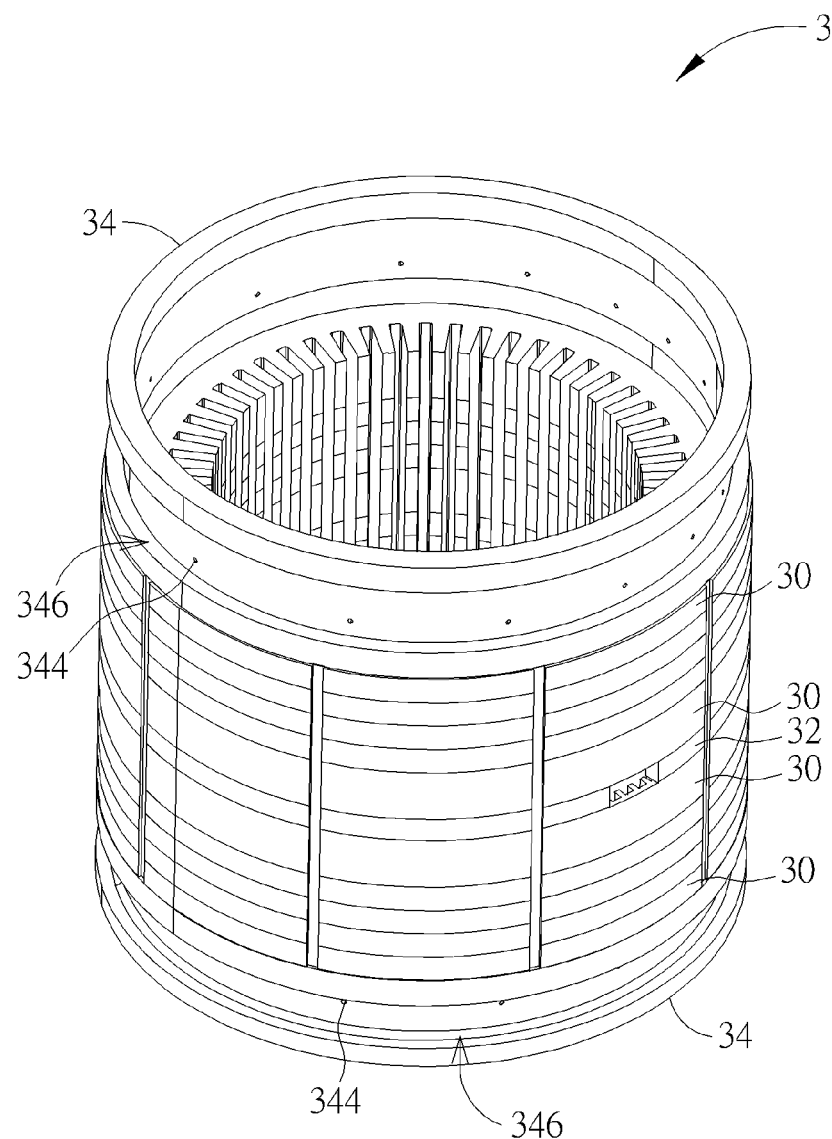
FIG. 13 is a perspective view illustrating a stator structure according to another embodiment of the invention.
Figure 14:
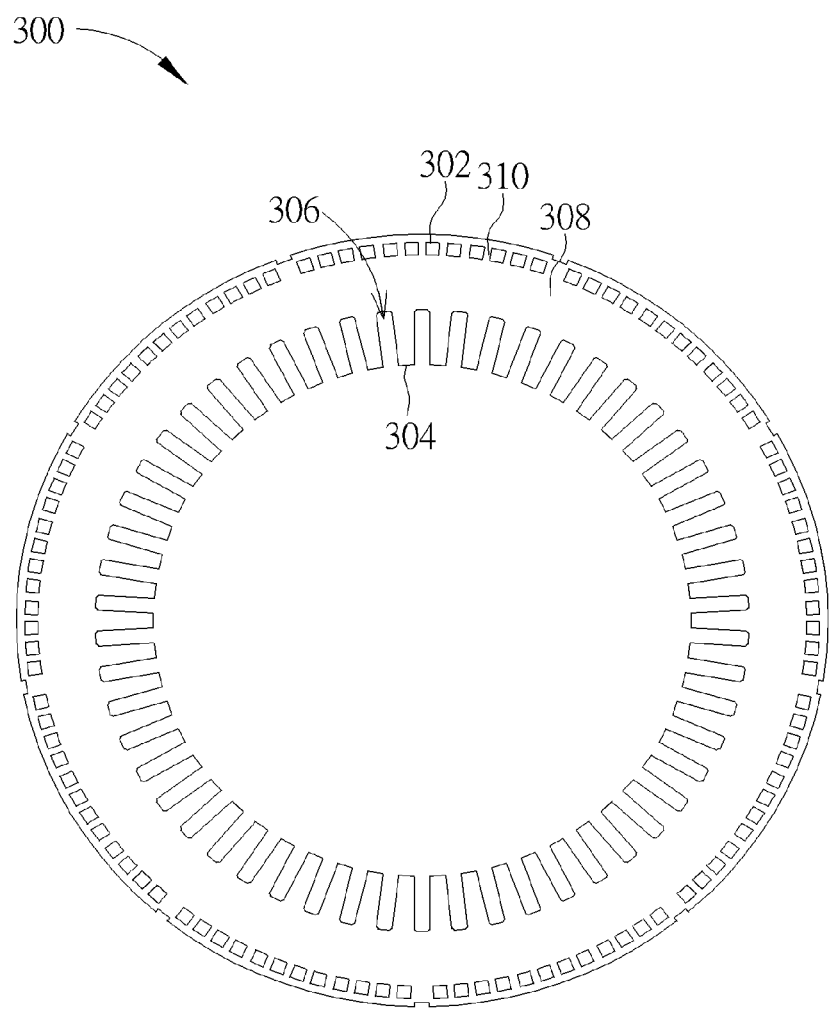
FIG. 14 is a top view illustrating a first lamination according to another embodiment of the invention.
Figure 15:
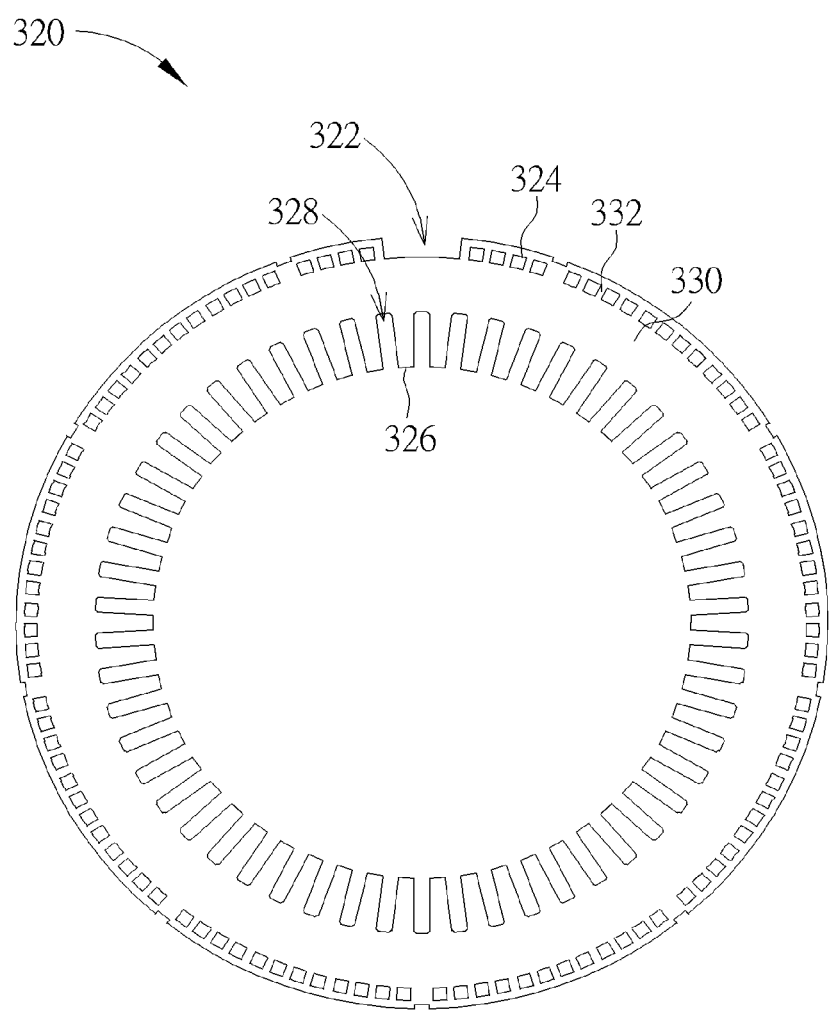
FIG. 15 is a top view illustrating a second lamination according to another embodiment of the invention.
Figure 16:
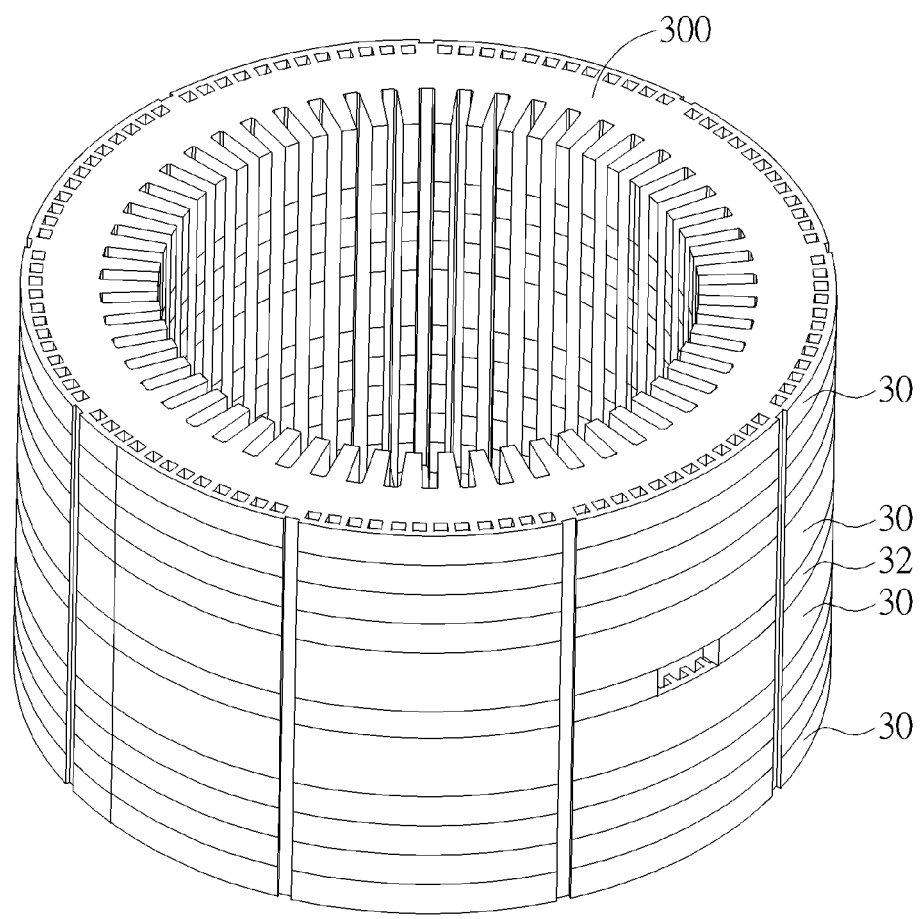
FIG. 16 is a perspective view illustrating the stator structure shown in FIG. 13 without the oil spraying ring.
Figure 17:
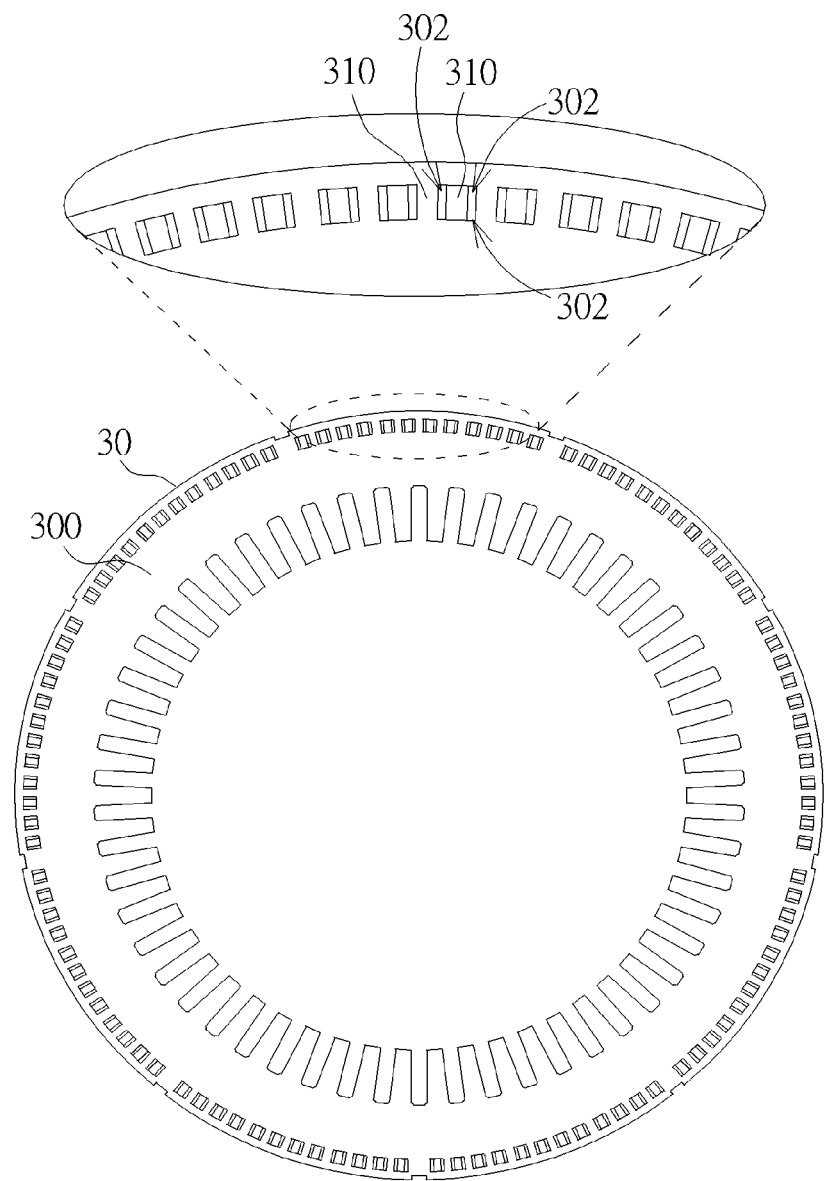
FIG. 17 is a top view illustrating two adjacent first lamination layers shown in FIG. 16.
Figure 18:
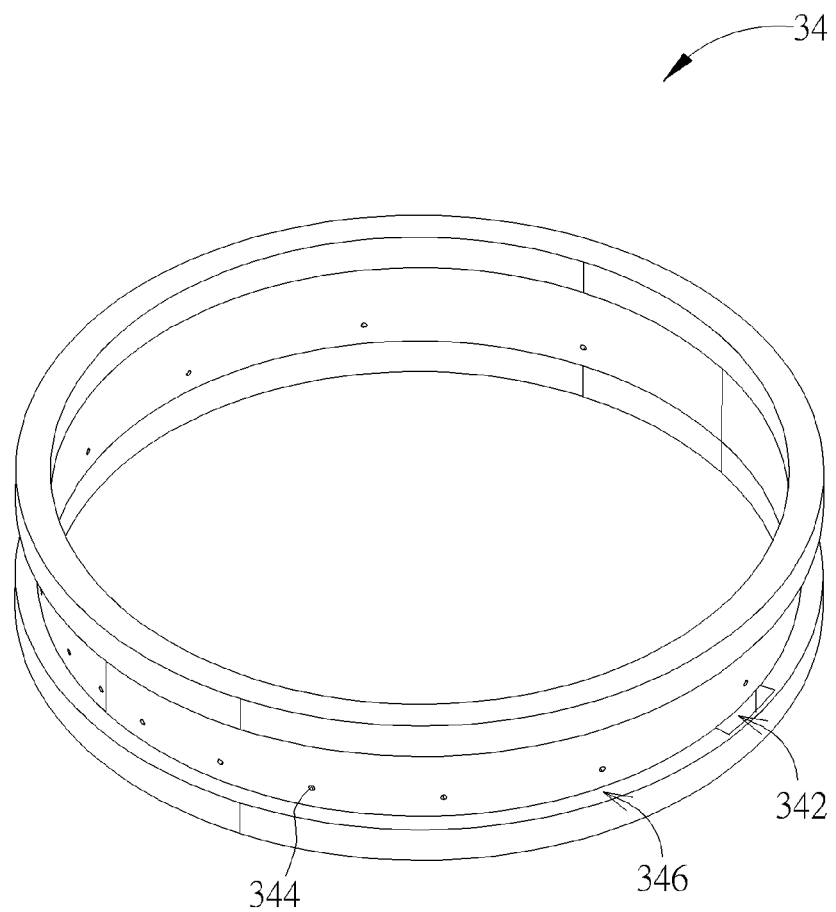
FIG. 18 is a perspective view illustrating the oil spraying ring shown in FIG. 13.
Figure 19:
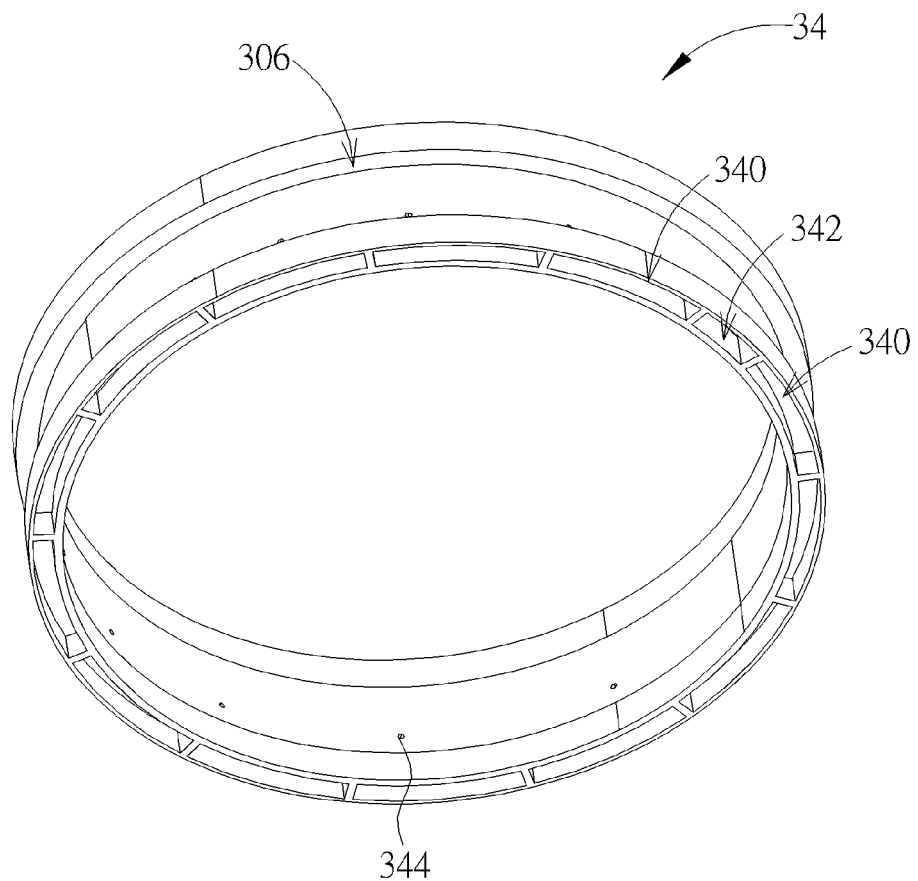
FIG. 19 is a perspective view illustrating the oil spraying ring shown in FIG. 13 from another viewing angle.
Figure 20:
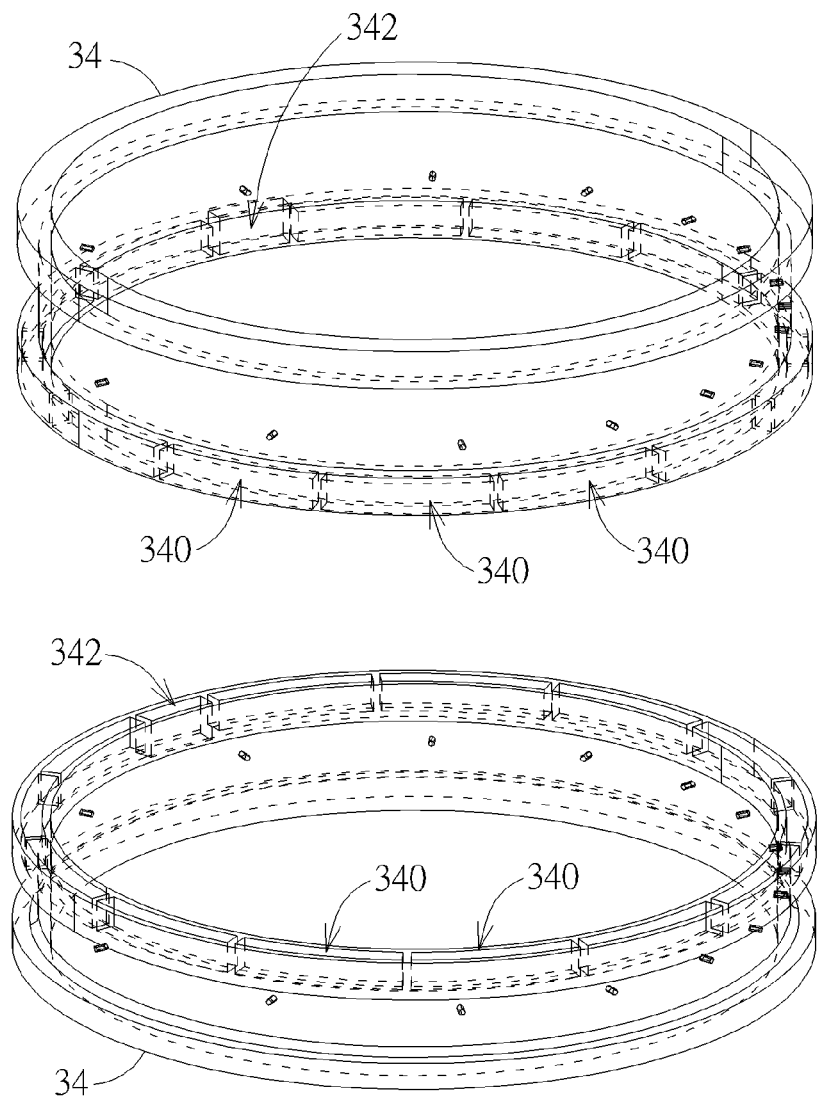
FIG. 20 is a perspective view illustrating the two oil spraying rings shown in FIG. 13.

Referring to FIGS. 13 to 20, FIG. 13 is a perspective view illustrating a stator structure 3 according to another embodiment of the invention, FIG. 14 is a top view illustrating a first lamination 300 according to another embodiment of the invention, FIG. 15 is a top view illustrating a second lamination 320 according to another embodiment of the invention, FIG. 16 is a perspective view illustrating the stator structure 3 shown in FIG. 13 without the oil spraying ring 34, FIG. 17 is a top view illustrating two adjacent first lamination layers 30 shown in FIG. 16, FIG. 18 is a perspective view illustrating the oil spraying ring 34 shown in FIG. 13, FIG. 19 is a perspective view illustrating the oil spraying ring 34 shown in FIG. 13 from another viewing angle, and FIG. 20 is a perspective view illustrating the two oil spraying rings 34 shown in FIG. 13.

As shown in FIG. 13, a stator structure 3 includes a plurality of first lamination layers 30, a second lamination layer 32 and two oil spraying rings 34. The second lamination layer 32 is sandwiched in between two first lamination layers 30 and located in the middle of the stator structure 3. The two oil spraying rings 34 are connected to two first lamination layers 30 located at outermost sides.

Each first lamination layer 30 is formed by stacking at least one first lamination 300 (as shown in FIG. 14), wherein the first lamination 300 may be a silicon steel sheet. The number of the first lamination layers 30 and the number of the first laminations 300 of each first lamination layer 30 may be determined according to structural requirements. As shown in FIG. 14, the first lamination 300 has a plurality of first oil passages 302, a plurality of first stator tooth portions 304, a plurality of first stator slots 306 and a first stator yoke portion 308. The first stator yoke portion 308 is circular. The first oil passages 302 are formed on the first stator yoke portion 308, wherein a first support rib 310 is between two adjacent first oil passages 302. The first stator tooth portions 304 and the first stator slots 306 are staggered with respect to each other in a circular shape.

The second lamination layer 32 is formed by stacking a plurality of second laminations 320 (as shown in FIG. 15), wherein the second lamination 320 may be a silicon steel sheet. The number of the second laminations 320 of the second lamination layer 32 may be determined according to structural requirements. As shown in FIG. 15, the second lamination 320 has a notch 322, a plurality of second oil passages 324, a plurality of second stator tooth portions 326, a plurality of second stator slots 328 and a second stator yoke portion 330. The second stator yoke portion 330 is circular. The notch 322 and the second oil passages 324 are formed on the second stator yoke portion 330, wherein a second support rib 332 is between two adjacent second oil passages 324. The second stator tooth portions 326 and the second stator slots 328 are staggered with respect to each other in a circular shape.

As shown in FIG. 16, the invention may stack a plurality of first laminations 300 to form a plurality of first lamination layers 30. When stacking the first lamination layers 30, the invention stacks one first lamination layer 30 first and then rotates and stacks next first lamination layer 30 by an angle, such that the first oil passages 302 of two adjacent first lamination layers 30 are misaligned, as shown in FIG. 17. Then, as shown in FIG. 16, the invention further stacks a plurality of second laminations 320 on the first lamination layer 30 to form a second lamination layer 32, wherein the second oil passages 324 of the second lamination layer 32 are also misaligned with the first oil passages 302 of the first lamination layer 30 adjacent to the second lamination layer 32 (as the misaligned arrangement shown in FIG. 17). Then, the invention further stacks a plurality of first lamination layers 30 on the second lamination layer 32 according to the aforesaid manner to obtain the symmetrical structure shown in FIG. 16. Then, as shown in FIG. 13, the invention further connects two oil spraying rings 34 to two first lamination layers 30 located at outermost sides of FIG. 16, so as to complete the manufacture of the stator structure 3.

In the stator structure 3, the first stator tooth portions 304 of the first lamination layer 30 and the second stator tooth portions 326 of the second lamination layer 32 are aligned with each other, and the first stator slots 306 of the first lamination layer 30 and the second stator slots 328 of the second lamination layer 32 are aligned with each other, so as to avoid hindering the subsequent winding of a winding.

As shown in FIGS. 18 and 19, each oil spraying ring 34 has a plurality of oil passage switching recesses 340, an oil passage outlet 342, a plurality of oil spraying holes 344 and a circular recess 346. The oil passage switching recesses 340 and the oil passage outlet 342 are arranged in a circular shape. The oil spraying holes 344 are formed in the circular recess 346. The oil passage outlet 342 communicates with the circular recess 346. Each oil passage switching recess 340 and the oil passage outlet 342 respectively communicate with parts of the first oil passages 302 (as shown in FIG. 16). Furthermore, as shown in FIG. 20, the oil passage switching recesses 340 of the two oil spraying rings 34 are misaligned.

When the heat generated by a motor equipped with the stator structure 3 is dissipated by oil cooling, cooling oil can be injected from the notch 322 of the second lamination layer 32. At this time, the cooling oil flows along the first oil passages 302 of the first lamination layer 30, the second oil passages 324 of the second lamination layer 32 and the oil passage switching recesses 340 of the oil spraying ring 34, and then flows into the oil passage outlet 342 of the oil spraying ring 34 from the first oil passages 302 of the first lamination layer 30 located at outermost side. Then, the cooling oil flows into the circular recess 346 of the oil spraying ring 34 from the oil passage outlet 342 and then is sprayed to internal components of the stator structure 3 from the oil spraying holes 344 of the oil spraying ring 34 for performing oil cooling.

By means of the stacking and arrangement of the first lamination layer 30, the second lamination layer 32 and the oil spraying ring 34, the invention not only can effectively increase the contact area between the oil passage and the cooling oil, but also can reduce the cross-sectional area of the flow path of the cooling oil, thereby increasing the flow rate of the cooling oil. Accordingly, the stator structure 3 of the invention can effectively improve heat dissipating effect for oil cooling.

Figure 21:
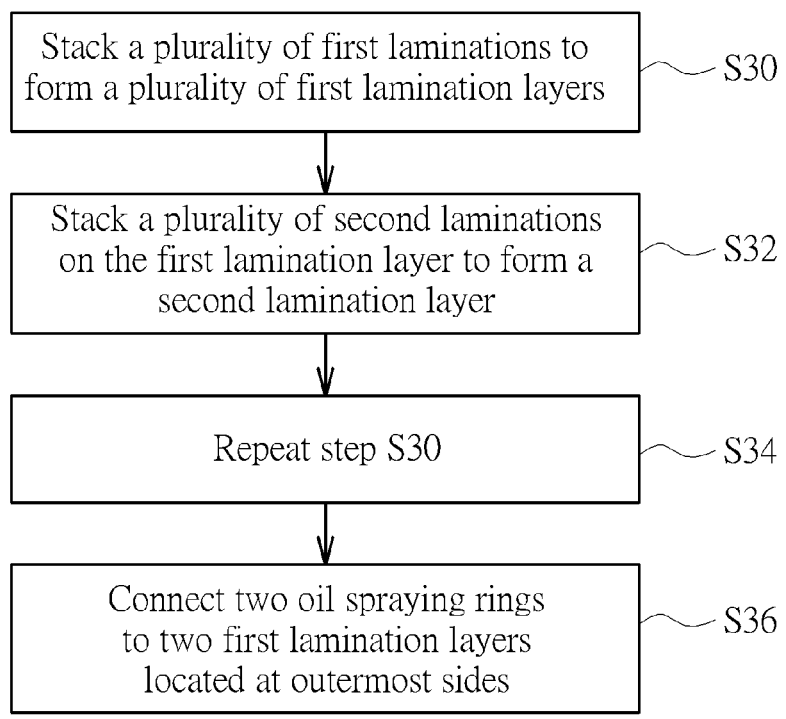
FIG. 21 is a flowchart illustrating a method for manufacturing a stator structure according to another embodiment of the invention.

Referring to FIG. 21, FIG. 21 is a flowchart illustrating a method for manufacturing a stator structure according to another embodiment of the invention. First, step S30 is performed to stack a plurality of first laminations 300 to form a plurality of first lamination layers 30, wherein when stacking the first lamination layers 30, the invention stacks one first lamination layer 30 first and then rotates and stacks next first lamination layer 30 by an angle, such that a plurality of first oil passages 302 of two adjacent first lamination layers 30 are misaligned. Then, step S32 is performed to stack a plurality of second laminations 320 on the first lamination layer 30 to form a second lamination layer 32, wherein a plurality of second oil passages 324 of the second lamination layer 32 are misaligned with the first oil passages 302 of the first lamination layer 30 adjacent to the second lamination layer 32. The, step S34 is performed to repeat step S30. Then, step S36 is performed to connect two oil spraying rings 34 to two first lamination layers 30 located at outermost sides, wherein each oil spraying ring 34 has a plurality of oil passage switching recesses 340, an oil passage outlet 342, a plurality of oil spraying holes 344 and a circular recess 346, the oil passage switching recesses 340 and the oil passage outlet 342 are arranged in a circular shape, the oil spraying holes 344 are formed in the circular recess 346, the oil passage outlet 342 communicates with the circular recess 346, each oil passage switching recess 340 and the oil passage outlet 342 respectively communicate with parts of the first oil passages 302, and the oil passage switching recesses 340 of the two oil spraying rings 34 are misaligned. It should be noted that the detailed embodiments of the stator structure 3 are mentioned in the above and those will not be depicted herein again.

Based on the foregoing, the invention can effectively increase the contact area between the oil passage and the cooling oil and increase the flow rate of the cooling oil by means of the arrangement of the aforesaid stator structure, thereby effectively improving heat dissipating effect for oil cooling.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A stator structure comprising:
   a plurality of first lamination layers, each first lamination layer being formed by stacking at least one first lamination, each first lamination having a first notch, the first notches of two adjacent first lamination layers being misaligned by 180 degrees;
   a plurality of second lamination layers sandwiched in between the first lamination layers, each second lamination layer being formed by stacking a plurality of second laminations, each second lamination having a plurality of first oil passages, the first oil passages of two adjacent second lamination layers being misaligned;
   two third lamination layers, the second lamination layer located in the middle of the stator structure being sandwiched in between the two third lamination layers, each third lamination layer being formed by stacking a plurality of third laminations, each third lamination having a second notch and a plurality of second oil passages, the second notch being misaligned with the first notch of the first lamination layer adjacent to the third lamination layer by 180 degrees, the second oil passages being misaligned with the first oil passages; and
   two oil spraying rings connected to two first lamination layers located at outermost sides.

2. The stator structure of claim 1, wherein each first lamination has a plurality of first stator tooth portions, each second lamination has a plurality of second stator tooth portions, each third lamination has a plurality of third stator tooth portions, and the first stator tooth portions, the second stator tooth portions and the third stator tooth portions are aligned with each other.

3. The stator structure of claim 2, wherein each first lamination has a plurality of first stator slots, the first stator tooth portions and the first stator slots are staggered with respect to each other in a circular shape, each second lamination has a plurality of second stator slots, the second stator tooth portions and the second stator slots are staggered with respect to each other in a circular shape, each third lamination has a plurality of third stator slots, the third stator tooth portions and the third stator slots are staggered with respect to each other in a circular shape, and the first stator slots, the second stator slots and the third stator slots are aligned with each other.

4. The stator structure of claim 1, wherein each first lamination has a first stator yoke portion, the first notch is formed on the first stator yoke portion, each second lamination has a second stator yoke portion, the first oil passages are formed on the second stator yoke portion, each third lamination has a third stator yoke portion, and the second notch and the second oil passages are formed on the third stator yoke portion.

5. The stator structure of claim 1, wherein a first support rib is between two adjacent first oil passages and a second support rib is between two adjacent second oil passages.

6. A method for manufacturing a stator structure comprising steps of:
   (a) stacking at least one first lamination to form a first lamination layer;
   (b) stacking a plurality of second laminations on the first lamination layer to form a plurality of second lamination layers, wherein when stacking the second lamination layers, stacking one second lamination layer first and then rotating and stacking next second lamination layer by an angle, such that a plurality of first oil passages of two adjacent second lamination layers are misaligned;
   (c) rotating and stacking at least one first lamination on the second lamination layer by 180 degrees to form another first lamination layer, wherein two first notches of two adjacent first lamination layers are misaligned by 180 degrees;
   (d) performing the step (b) again;
   (e) stacking a plurality of third laminations on the second lamination layer to form a third lamination layer, wherein a second notch of the third lamination layer is misaligned with the first notch of the first lamination layer adjacent to the third lamination layer by 180 degrees, and a plurality of second oil passages of the third lamination layer are misaligned with the first oil passages of the second lamination layer adjacent to the third lamination layer;
   (f) repeating the steps (b) and (C); and
   (g) connecting two oil spraying rings to two first lamination layers located at outermost sides.

7. The method of claim 6, further comprising step of:
   after the step (c), repeating the steps (b) and (C) at least one time first and then performing the step (d).

* * * * *